B. M. W. HANSON.
TURRET LATHE.
APPLICATION FILED NOV. 2, 1908.
1,000,515.
Patented Aug. 15, 1911.
2 SHEETS—SHEET 1.
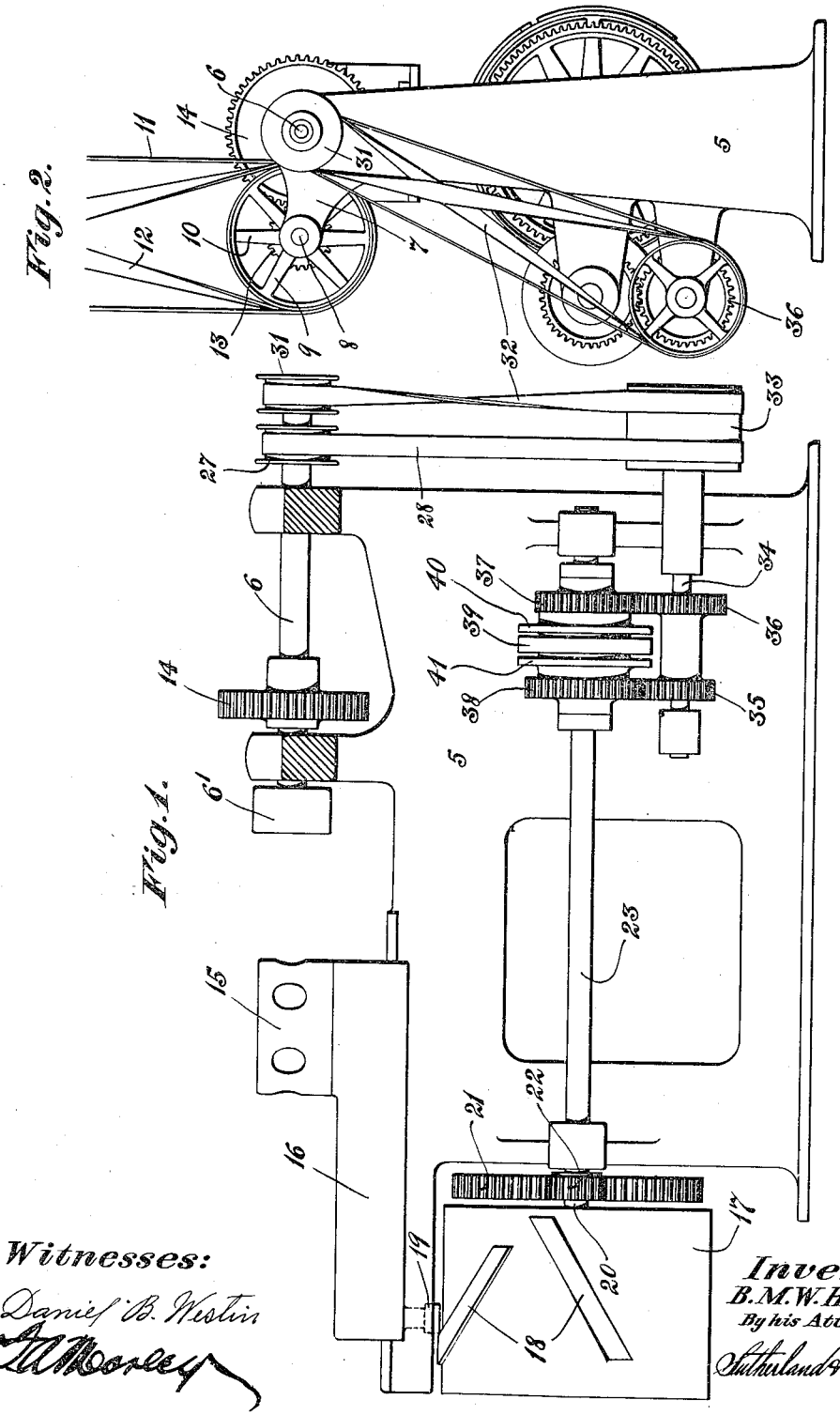
Witnesses:
Daniel B. Westin
Inventor:
B. M. W. Hanson
By his Attorneys,
Sutherland & Anderson

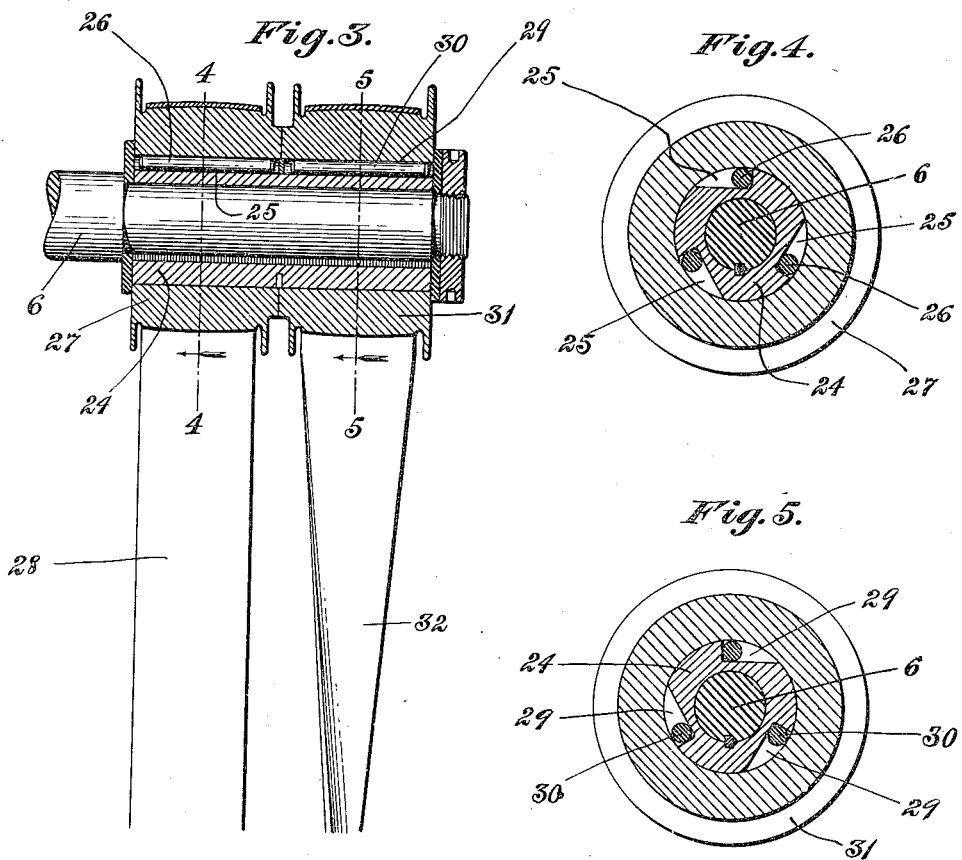

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

TURRET-LATHE.

1,000,515.

Specification of Letters Patent. Patented Aug. 15, 1911.

Application filed November 2, 1908. Serial No. 460,749.

*To all whom it may concern:*

Be it known that I, BENGT M. W. HANSON, a citizen of the United States, residing at Hartford, in the county of Hartford and State of Connecticut, have invented certain new and useful Improvements in Turret-Lathes, of which the following is a specification.

This invention relates to turret lathes. A machine of this type usually involves a reciprocatory carriage or slide upon which is rotatively mounted a turret, a cam drum for operating said carriage or slide, and a work-spindle.

It is one of the primary objects of the present invention to provide a mechanism whereby the said drum is always turned in the same direction from an oppositely-rotative work-spindle.

The parts to which I have briefly alluded may be of any desirable character; as a matter of fact my invention may be embodied in other types of metal working machines comprising a tool-carrier and a work-spindle or analogous devices.

The invention comprises other advantageous features which with the foregoing will be set forth at length in the following description wherein I shall outline in full that form of embodiment of the invention which I have selected for illustration in the drawings accompanying and forming part of the present specification.

Referring to said drawings, Figure 1 is a side elevation of a turret-lathe comprising my invention. Fig. 2 is an end elevation of the same. Fig. 3 is a sectional elevation of a spindle, pulley and belt mechanism and certain coacting parts hereinafter more fully described. Figs. 4 and 5 are transverse sections on the lines 4—4 and 5—5, respectively, of Fig. 3.

Like characters refer to like parts throughout the several figures.

The different parts of the machine may be mounted upon any suitable frame; that shown in the drawings and denoted in a general way by 5 satisfactorily answers my purpose.

A work or chuck spindle is shown at 6 and the same is rotatively supported by suitable bearings on the frame 5. This spindle or shaft 6 is oppositely rotative and for securing such function any desirable means may be employed for example belting, as will now appear.

The frame 5 is shown equipped with laterally extending brackets 7 which rotatively sustain a shaft as 8 to which are fastened pulleys as 9 and 10 respectively driven by straight and cross belts as 11 and 12. It therefore follows that when one belt is in action the said shaft 8 is driven in one direction and that when the other belt is in action said shaft will be turned oppositely. This shaft is operatively connected in some suitable manner with the chuck or work spindle 6 and for this purpose it is represented as having fixed thereto a pinion as 13 meshing with a gear as 14 fastened to said chuck or work spindle. The latter is illustrated as provided with the usual chuck 6'.

The carriage or slide for supporting the turret 15 is denoted by 16 and it has a traveling, reciprocatory movement on or in suitable ways upon the top of the frame 5 while suitable mechanism may be provided for rotating said turret either automatically or manually all as common in the art of metal-working machinery.

The drum for reciprocating the turret slide or carriage may be of any suitable type: that illustrated is designated by 17 and it is provided with oppositely set strips as 18 for engaging an anti-friction stud as 19 depending from the said turret carriage or slide as also common in this art for which reason it is not necessary for me to further describe in detail these elements. It is obvious of course that the drum is always turned in the same direction; that is said drum is not first operated in one direction to advance the turret carriage or slide and then turned in the opposite direction to retract or return said slide to its primary position.

The cam drum shaft is denoted by 20 and it is shown as provided with a gear 21 meshing with a pinion 22 fastened to the shaft 23 between which and the chuck or work spindle 6 the mechanism for always causing the rotation of said cam drum in the same direction from said chuck spindle, is interposed. This mechanism may be of any desirable nature and it is conceivable that the shaft 23 or its equivalent might be omitted. In other words my invention broadly contemplates the employment of an oppositely rotative chuck spindle and a cam drum for reciprocating a carriage and intermediate mechanism for always turning said drum in the same direction from said chuck spindle. I will now describe the mechanism illustrated for such purpose.

The chuck spindle 6 is shown as provided at or near its outer end with a ratchet-clutch sleeve 24 keyed or otherwise suitably fastened thereto and which is represented as having peripheral seats or pockets as 25 for the reception of rollers as 26. Loosely surrounding said sleeve 24 is a pulley as 27 around which a straight belt as 28 is passed. The said sleeve 24 is provided with a second set of peripheral pockets or seats as 29 for the reception of rollers as 30 and encircling the sleeve and inclosing said second set of rollers is a pulley as 31 around which is passed a crossed belt as 32. It should be stated that said pulley 31 is also loose with respect to said clutch-sleeve 24 and further that the sets of peripheral pockets or seats 25 and 29 in said sleeve are oppositely set, by reason of which when one pulley is being rotated through the intervention of the described clutch mechanism the other may rotate idly or perform no work. Said pulleys are therefore alternately effective; that is to say when the chuck spindle is rotating in one direction one pulley will be in action and the other out of action and when said spindle is turned in the opposite direction the reverse result will follow. The two belts 28 and 32 are also passed around a drum as 33 fastened to a shaft as 34 rotatively supported upon the frame 5 and operatively connected with the shaft 23 preferably through speed-varying mechanism, as will hereinafter appear, so that in this manner I can by regulating the speed of rotation of the cam-drum 17 correspondingly vary the velocity of travel of the reciprocatory carriage or slide 16. By reason of this feature it is not necessary that the cam elements as 18 on said cam-drum be adjustable. It might be stated at this point that it is ordinarily the case where a change in speed of a turret supporting carriage or slide is desired to accomplish the same by adjusting the cam-elements on the cam drum, of whatever nature the former may be and further that considerable skill is necessary to insure precisionized results. This is wholly eliminated by my construction. I might also state at this point that while one of the important features of my invention is in always turning the carriage-operating cam drum in the same direction it is not essential that said drum be utilized for moving the first forward and then rearward or outward for one of these functions may be secured by extraneous means it being well known that in this art a cam-drum is sometimes utilized for advancing a turret-supporting carriage or slide while a piston sometimes pneumatically operated, or a weight or equivalent means might be provided for returning or retracting said carriage or slide.

The shaft 34 is shown as having fixed thereto two gears as 35 and 36 of different diameters while loosely carried by the shaft 23 are gears as 37 and 38 also of different diameters. The large gear on the shaft 34 meshes with the small gear on the shaft 23 and vice versa so that through the agency of said trains of meshing gears different speeds of the shaft 23 can be obtained. The loose gears 37 and 38 may be coupled or clutched to their supporting shaft 23 in any desirable way, for example by a clutch member as 39 splined or otherwise fitted to said shaft 23 for sliding movement thereto and to alternately engage the clutch elements 40 and 41 rigid respectively with the gears 37 and 38. It follows that when the gear 37 is clutched to the shaft 23 the latter will be driven at its high speed and that the opposite function will occur when the gear 38 is clutched to said shaft 23. The clutch member 39 may be either manually or automatically operated and should it be operated by hand, which is not generally the case, the whole apparatus is otherwise automatic in action although I do not restrict myself in this respect for in some cases certain of the parts may be operated by hand. The advantages of the automatic mechanism between the oppositely-rotative chuck or work-spindle and the cam drum for always turning the latter in the same direction are obvious.

I do not limit myself to the construction illustrated in the drawings and hereinbefore described in detail for many variations therefrom may be adopted within the scope of my claims.

What I claim is:

1. The combination of an oppositely-rotative work-spindle, a tool-carrier, a cam-drum for operating said tool-carrier, and automatically-operative mechanism actuated by said spindle for always turning said drum in the same direction during the opposite motion of said spindle.

2. The combination of an oppositely-rotative work-carrier, a tool-carrier, a cam-drum for operating said tool-carrier, and means whereby said cam-drum may be always operated in the same direction from said oppositely-rotative work-spindle during opposite motions thereof.

3. The combination of an oppositely-rotative work-spindle, a turret and its slide, a cam-drum for reciprocating said slide, and automatically-operative mechanism actuated by said spindle for always turning said drum in the same direction during opposite motions of said work-spindle.

4. The combination of an oppositely-rotative work-spindle, a tool-carrier, a cam drum for operating said tool-carrier, a pair of driving members, automatic mechanism operable from said work-spindle for turning said driving members in opposite directions, and mechanism operable from said driving members for always turning said cam drum in the same direction during opposite motions of said work-spindle.

5. The combination of an oppositely-rotative work-spindle, a tool-carrier, a cam-drum for operating said tool-carrier, a pair of pulleys loosely supported by said spindle, clutch-mechanism operable by said spindle for oppositely rotating said pulleys, straight and crossed belts passed around the said pulleys, a drum over which both belts are passed, and mechanism for transferring the effect of said drum to said cam-drum for always turning the latter in the same direction.

6. The combination, with the work-spindle and the cam-drum for operating the tool-slide, of a driving member, mechanism connecting said driving member to said spindle, means for reversing the rotation of said spindle, two trains of mechanism operated from said spindle-operating mechanism for rotating said cam-drum, one of said trains operating to rotate the cam-drum when the spindle is rotated in one direction, and the other train operating to rotate said cam-drum when the spindle is rotated in the opposite direction.

In testimony whereof I affix my signature in presence of two witnesses.

BENGT M. W. HANSON.

Witnesses:
W. M. STORRS,
EVERETT E. ARNOLD.